United States Patent [19]

Heffner et al.

[11] 4,136,343

[45] Jan. 23, 1979

[54] MULTIPLE SOURCE TRACKING SYSTEM

[75] Inventors: Roy W. Heffner; Robert B. Blanning, both of Orlando, Fla.

[73] Assignee: Martin Marietta Corporation, Orlando, Fla.

[21] Appl. No.: 792,957

[22] Filed: May 2, 1977

[51] Int. Cl.$^2$ .......................... G01S 3/42; F41G 7/00
[52] U.S. Cl. ............................... 343/117 R; 244/3.19;
343/7.4; 343/16 M
[58] Field of Search ............ 343/117 R, 7.4, 7 A, 343/16 M; 244/3.19

[56] References Cited

U.S. PATENT DOCUMENTS

| | | | |
|---|---|---|---|
| 3,130,402 | 4/1964 | Kuck | 343/7.4 |
| 4,010,467 | 3/1977 | Silvka | 244/3.19 X |

Primary Examiner—Maynard R. Wilbur
Assistant Examiner—Richard E. Berger
Attorney, Agent, or Firm—Julian C. Renfro; Gay Chin

[57] ABSTRACT

A monopulse radio direction finding and tracking system having the capacity of detecting the presence of multiple radiating sources within the effective beamwidth of the monopulse antenna and causing the monopulse antenna to move toward and align its boresight with one of the multiple sources. Signal processing is provided that implements an algorithm based on the amplitudes and absolute magnitudes of signals from a receiver sum channel, elevation and azimuth difference channels, and elevation and azimuth angular error channels. The algorithm utilizes the differences in the ratio of signals present in these channels when a single radiating source is present and when multiple sources are present. Steering control circuits are provided that bias the azimuth and elevation antenna steering servo system to cause the antenna to align its boresight with one of such multiple sources. The improved monopulse tracking system is applicable to a missile guidance system providing terminal guidance to cause the missile to intercept one of multiple radiating targets. Means are provided to accommodate multiple sources or targets in any orientation with respect to the monopulse antenna azimuthal and elevation planes.

16 Claims, 9 Drawing Figures

TWO SOURCES WITHIN
ANTENNA BEAMWIDTH

TWO SOURCES WITH
CENTROID ON BORESIGHT $$k = \frac{QE_1}{T_2}$$

MULTIPLE SOURCE TRACKING SYSTEM

BACKGROUND OF THE INVENTION

1. Field of the Invention

The present invention relates to a monopulse radio tracking system, and more particularly to a monopulse system operable in a multiple source environment.

2. Description of the Prior Art

Monopulse radio tracking systems have been known and utilized in the prior art for direction finding and for guidance of missiles to intercept active or passive targets. A typical system uses four horn antennas where signals are combined to produce sum and difference signals. These signals are processed in a superheterodyne circuit to produce a sum IF signal, and azimuth and elevation difference IF signals. The IF signals are detected and processed to obtain a measure of the angular displacement of a source signal from the boresight of the antenna. In a tracking system, the measure thus derived is utilized to generate servo control signals causing the antenna boresight to become aligned with the source signal. Such prior art tracking systems are satisfactory when a single source or target is within the antenna beamwidth; however, when multiple targets are present and within the antenna beamwidth, known prior art systems cannot discriminate among such multiple targets. In general, a typical monopulse system will track the weighted power centroid of the multiple sources. Consequently, a missile control system based on prior art tracking systems will cause the vehicle to pass between multiple targets.

SUMMARY OF THE INVENTION

Our invention comprises a signal processing system in combination with a monopulse radio tracking system that advantageously detects the presence of multiple source signals within the antenna beamwidth, selects one of the sources, and causes the system to lock onto and track the selected source. The initial function of the invention is to recognize the presence of multiple sources. This function is performed by the multiple source technique (MUST) logic which utilizes the relationships between the elevation and azimuth difference IF signals and the sum IF signal from the monopulse receiver for the single source case to that for the multiple source case.

For the single source case, alignment of the antenna boresight axis with the source results in essentially zero amplitude of the bipolar angular error steering signals and also both elevation and azimuth difference IF signal magnitudes simultaneously with maximum amplitude of the sum IF signal. Therefore, the ratios of the IF difference amplitudes or envelopes to the IF sum amplitude or envelope is very small. However, when the antenna boresight is aligned with the weighted power centroid of a multiple source case, the contributions of each source to the resultant steering error null signal is obtained from their respective difference IF channel signals that are not zero. For independent sources, the signals are uncorrelated and superposition is valid. The ratio of the difference IF signal to the sum IF signal is therefore significantly larger in either one or both channels than that for the single source case. The MUST logic compares this ratio to a threshold selected in accordance with the single source ratio and a "multiple source" decision is made when the selected threshold is exceeded in either the elevation or the azimuth channel, or in both.

In the prior art monopulse tracking system, the difference channel IF signals and the sum channel IF signal are multiplied in phase detector circuits to produce an elevation angle error signal and an azimuthal angle error signal. These error signals conventionally are connected as inputs to the servo controls that serve to bring the antenna boresight into alignment with the source. Advantageously, in our invention this connection is interrupted when multiple targets are detected as described above. The second function of our invention is therefore to furnish modified control signals to the servo system in such case so as to align the antenna boresight to one of the multiple targets rather than to the centroid of the targets.

Assume that the azimuth channel of the MUST detection logic indicates presence of multiple sources. A control signal is then generated for operating a relay to switch the azimuth servo input from the monopulse azimuth error signal to an azimuth "algorithm" circuit. The algorithm circuit generates a new MUST error control signal based on the difference between the amplitude of the azimuth difference IF signal and the weighted absolute value of the azimuth error signal, and assigns the same polarity to the new error signal as that of the original azimuth error signal. Also, when multiple sources occur in the elevation plane, a new elevation error control signal is generated and switched to the elevation servo.

As may now be seen, boresight will occur when the output of the algorithm circuit approaches zero. The MUST control signal generating circuit also provides means for insuring that, for the case of multiple targets in both planes, both azimuth and elevation controls track the same selected source.

Therefore, it is a primary object of our invention to provide a monopulse radio tracking system that can detect the presence of multiple radiating sources within the system antenna beamwidth.

It is another object of our invention to provide a monpulse radio tracking system that is capable of selecting one of multiple sources in its antenna beamwidth and track the selected source.

It is yet another object of our invention to provide a monopulse radio tracking system that is capable of tracking one of multiple sources wherein such multiple sources lie in the azimuth plane.

It is still another object of our invention to provide a monopulse radio tracking system that is capable of tracking one of multiple sources wherein such multiple sources lie in the elevation plane.

It is a further object of our invention to provide a monopulse radio tracking system that is capable of tracking one of multiple sources wherein such multiple sources lie in both azimuth and elevation planes.

It is yet a further object of our invention to provide multiple source logic circuits to adapt an existing monopulse radio tracking system to operate effectively in a multiple source environment.

It is still a further object of our invention to provide multiple source logic circuits for a target seeking missile system to control the missile in a multiple target environment to home on one of such targets.

These and other objects and advantages of our invention will become apparent from the detailed description hereinafter and with reference to the drawings.

DETAILED DESCRIPTION OF THE PREFERRED EMBODIMENT

Prior Art

Figure 1:
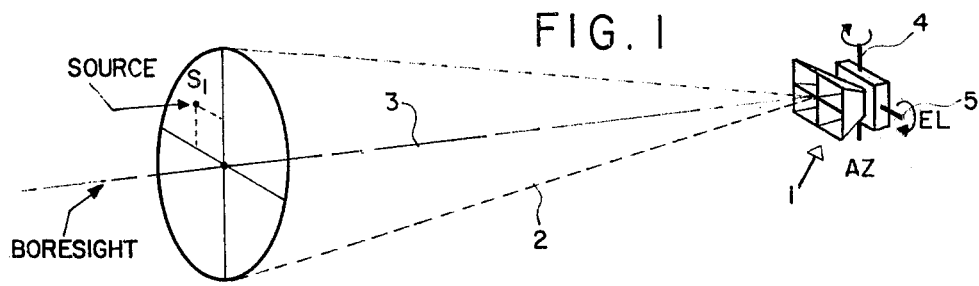
FIG. 1 is functional representation of a typical tracking antenna and its half-power radiation pattern (not to scale) with a radiating source within its beamwidth.

Monopulse tracking or radio direction finding devices are well known in the prior art. For example, see "Introduction to Radar Systems", M. Skolnik, McGraw Hill, pp. 175, 184. FIG. 1 illustrates a typical tracking antenna 1 having a half-power beamwidth antenna pattern 2, with the width of the beam greatly exaggerated for illustrative purposes. A radiating source is shown that falls within the effective antenna beamwidth 2 but at a point S, off from the antenna boresight 3. In accordance with a typical monopulse tracking system, an error signal in elevation will be generated causing the antenna to rotate in elevation about elevation axis 5 a sufficient angle to reduce the elevation error to zero. Similarly, an azimuth error signal causes rotation about the azimuthal axis, 4, reducing that error to zero. At this point, the sources will be directly on the boresight axis 3 as desired.

Figure 2:
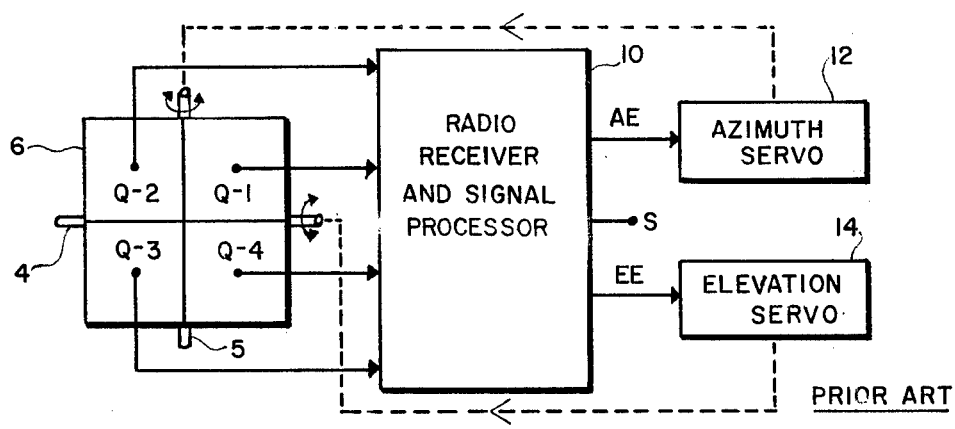
FIG. 2 is a block diagram of a conventional prior art monopulse tracking system.

FIG. 2 is a functional block diagram of a prior art monopulse tracking system. Antenna assembly 6 comprises four quadrant type directional antennas Q-1 through Q-4. Radio receiver and signal processor 10 receive energy from each antenna, process the signals to develop composite sum and difference signals to thereby generate an azimuth error signal, AE, and an elevation error control signal, EE, whose amplitudes and phases are proportional to the angular distances from boresight of the source being received. Servos 12 and 14, responsive to the respective error control signals AE and EE appropriately rotate antenna assembly 6 about its axes 4 and 5. As the antenna beam moves in a direction to reduce the angular errors, the error signals AE and EE reduce in amplitude, each approaching zero as the boresight is brought into coincidence with the radiating source, for example, $S_1$ of FIG. 1. Additionally, a summation signal S is generated by receiver and processor 10 which is proportional to the sum of the energy being received by each antenna in the array 6, signal S being used as discussed hereinbelow.

Figure 3:
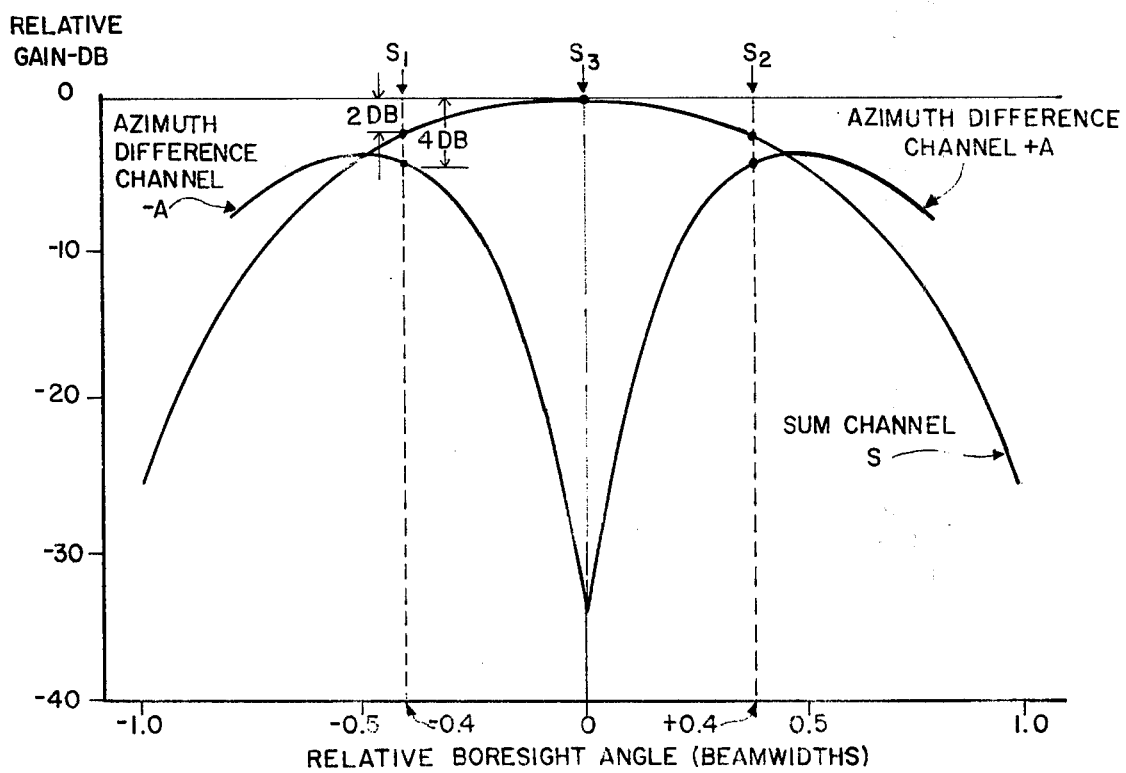
FIG. 3 is an antenna response function normalized with respect to beamwidth and typical of the prior art system of FIG. 2.

A typical antenna response function for a prior art system such as shown in FIG. 2 is shown in FIG. 3. Shown as a function of the relative boresight angular displacement of a signal are: S, the output of the summation channel; and A, the output of the azimuth difference channel from which error signal AE is generated. In general, the response function for the elevation difference channel will be identical to that of the illustrated azimuthal channel. The ordinate represents the relative output of the channel with respect to the sum channel output at boresight, and the abscissa represents the normalized angle in fractional beamwidths from boresight. The polarity of the difference channel relative to the sum channel has odd symmetry about the boresight as shown.

Assume that the source is on boresight in the azimuthal plane; the sum channel S has a relative output of 0 dB and the azimuth difference channel output is at a null of greater than $-30$ dB indicating no error. As the source moves off boresight to a relative angle of, say, 0.4 beamwidth, the relative error signal increases to $-4$ dB, a change of more than 26 dB. If the source were moved off boresight to $-0.4$ beamwidth, the relative error signal would also be $-4$ dB but 180° out of phase with the signal from a positive displacement. Note that receiver AGC action would be to normalize the sum/difference channel signals relative to a constant level sum value.

Figure 4:
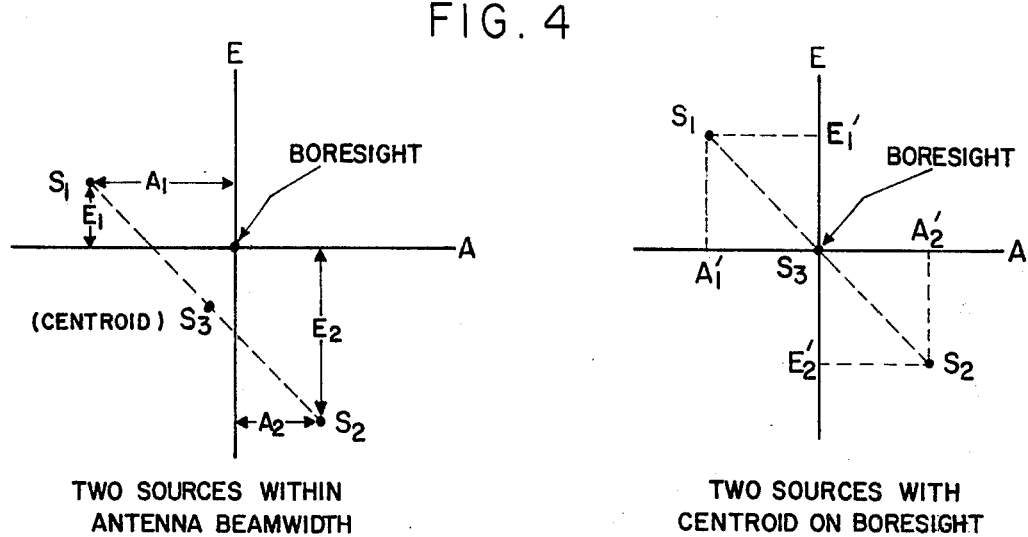
FIG. 4 is a graphical representation of two randomly located radiating sources falling within the beamwidth of a monopulse antenna system and also for the case in which the power weighted centroid of the two sources is aligned with the antenna boresight.

Having briefly described the characteristics of a typical monopulse tracking system for a single source, the problem that the present invention solves will now be described. It is common to use the monopulse technique to provide guidance control for homing missiles and the like. The elevation and azimuth error signals are utilized in this application to control the antenna gimbal mount such that the antenna boresight is aligned with the source. A gimbal head rate pick off generates signals used to control the missile autopilot for flight attitude control. Thus, a target source can be maintained on boresight such that the vehicle will intercept the target. The problem arises when multiple targets having approximately equal power radiation fall within the angular resolution or beamwidth of the antenna pattern. The problem is illustrated by FIG. 4 for two noncoherent sources $S_1$ and $S_2$ which are assumed to lie within the beamwidth of an exemplary homing guidance seeker. Assuming equal received energy from each source, the azimuth error channel would generate an error signal equal to the algebraic sum of $A_1$ and $A_2$, and the elevation error channel would generate an error signal equal to the algebraic sum of $E_1$ and $E_2$. The control system would change the attitude of the antenna gimbal to reduce the azimuthal and elevation error sums to zero, moving the boresight to apparent source $S_3$ midway between the two actual sources $S_1$ and $S_2$. The missile autopilot responds to align the direction of flight relative to the antenna boresight. Therefore, the closing path is through the apparent source, missing both targets. It may be demonstrated that, in general, the apparent source is the radiated power weighted centroid of the multiple sources.

The condition of boresight aligned with the centroid of the two sources is also shown in FIG. 4 in which the output of the difference channels each contain composite signals, for example, the composite elevation difference signal is composed of approximately equal signals $E_1$ and $E_2$. It is to be noted that these signals are uncorrelated in the effective processing interval and therefore add only in a power sense.

PRESENT INVENTION

To solve the above described inherent problem of prior art tracking systems, our invention advantageously detects the presence of multiple sources, selects one of such sources, and generates an error-correcting signal to cause the system boresight to be moved to be coincident with the selected source.

Figure 5:
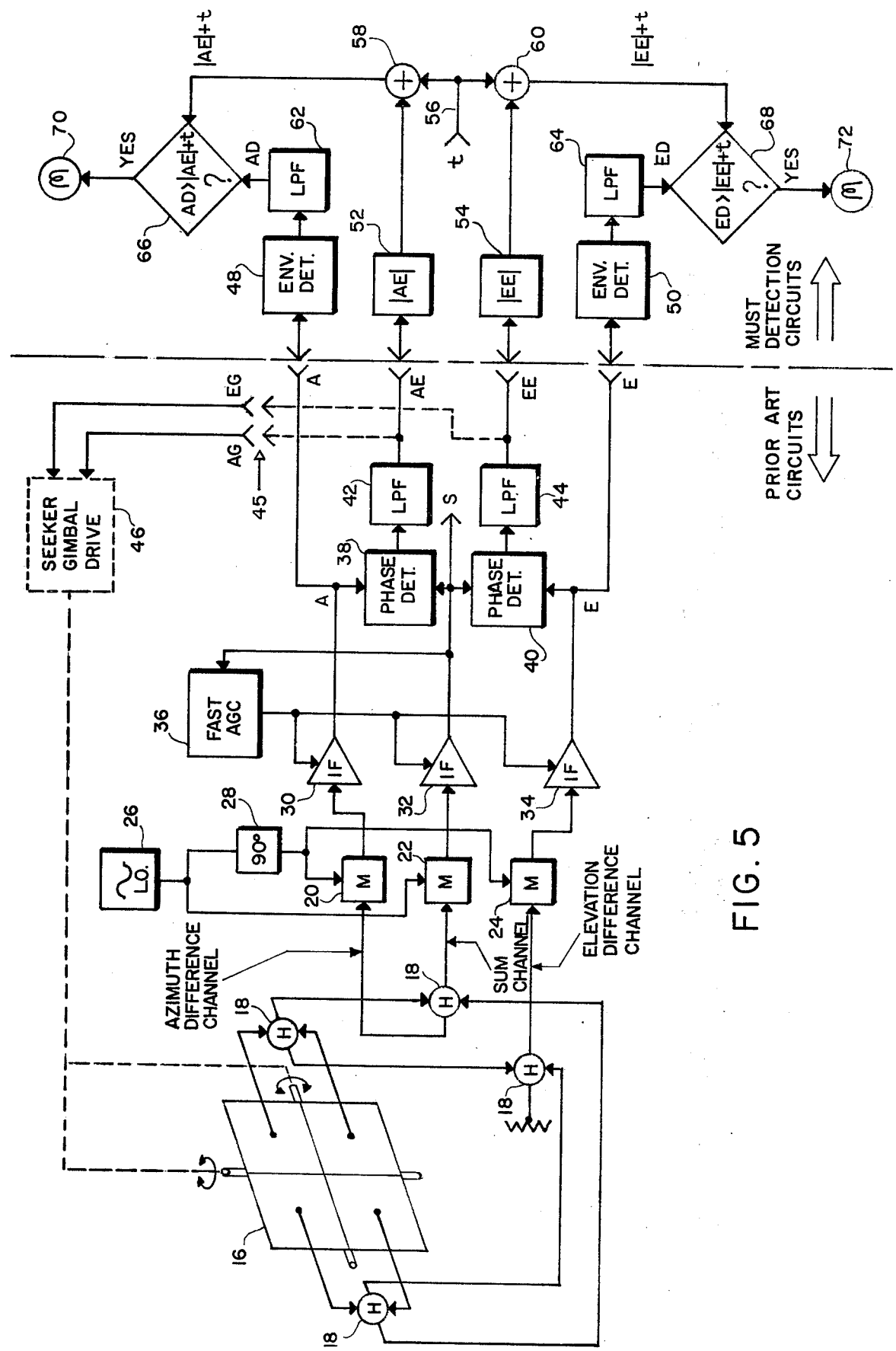
FIG. 5 is a functional block diagram of a preferred embodiment of our invention for detecting the presence of multiple sources within its antenna beamwidth.

Turning now to FIG. 5, we have shown a functional block diagram of a preferred embodiment of our invention for detecting the presence of multiple sources of radiated energy within the beamwidth of the antenna system. As may be understood, the detection function is the first step toward generating the required correction signals to select one of such multiple sources.

A conventional antenna array 16 is provided with a set of four hybrids 18 which appropriately combine the signals from the four independent antennas making up array 16 so as to form an azimuth difference signal which feeds mixer 20, an elevation difference signal which feeds mixer 24, and a sum signal which feeds mixer 22.

Mixers 20, 22 and 24 are a set of matched mixers utilized in a conventional superheterodyne configuration with a common local oscillator 26. As may be noted, sum channel mixer 22 receives the local oscillator signal directly while the difference channel mixers 20 and 24 receive the local oscillator signal shifted in phase 90° by phase shifter 28. This arrangement compensates for any hybrid combiner phase shifts to ensure that the error channel signal is either in-phase or 180° out of phase with the corresponding sum-channel component out of mixers 20, 22, 24.

IF outputs from mixers 20, 22 and 24 are coupled to respective IF amplifiers 30, 32, 34. The output from the sum channel amplifier 32 drives fast AGC circuit 36 whose output is used to control the gain of all the IF amplifiers thereby normalizing the three channels with respect to the sum channel.

The sum channel output of IF amplifier 32 is used as a reference for phase detectors 38 and 40. The phase detector is a product device such as a ring demodulator. Phase detector 38 produces an output signal having a magnitude and polarity proportional to the angular separation of the source for the azimuthal boresight plane. Since the signal A at the output of IF amplifier 30 has an inphase or out-of-phase relationship to the sum signal S, it may be seen that as the A vector varies in magnitude and polarity with respect to the normalizing S vector, the resulting product output is either positive or negative. For a single source, the magnitude of the error signal is proportional to the envelope of the IF output signal A.

Similarly, phase detector 40 driven by the elevation difference IF amplifier 34 produces an error signal EE that represents the angular relation between the source and the boresight elevation plane. The outputs of phase detectors 39 and 40 are smoothed by low pass filters 42 and 44 respectively. The error signals, AE and EE are, for prior art systems, connected to the seeker gimbal drive circuits 46 at points AG and EG such that a single source can be placed on the antenna boresight. This connection 45 is shown by dashed lines and when so connected will cause the system to place the boresight on the power centroid of multiple targets.

Advantageously, in the embodiment shown in FIG. 5, we provide multiple source technique (MUST) circuits to detect the presence of multiple targets or sources. The MUST circuits require as inputs the following signals: output of azimuth difference channel A; output of azimuth error detector circuits AE; output of elevation difference channel E; and output of elevation error detection circuits EE. The MUST circuits perform appropriate logic operations on these signals to determine the presence of multiple sources as will be described in detail hereinafter. However, before explaining the operation of the MUST processor, it is pertinent to develop and point out the algorithm utilized in the process.

As previously discussed with reference to the monopulse antenna response function of FIG. 3, a single signal source will, when on exact boresight, produce a very small difference signal in both the azimuth and elevation channels. Relating this condition to FIG. 5, it can be noted that the amplitude of the IF signal A would be over 30 dB below the sum signal S. Similarly, the magnitude of signal AE from azimuth phase detector 38 will be essentially zero, indicating an angle of essentially 0° with respect to boresight. For this example, the same condition will obtain with respect to elevation difference signal E and the elevation angle error signal EE. Now, if the magnitude of the envelope of IF signal A is subtracted from the magnitude of the envelope of IF signal S, the resultant signal will be almost equal to S; that is, the ratio of $|S|$ to $|A|$ is greater than 30 db. This condition is thus seen to be representative of the single source condition at boresight.

Assume now however, that two signal sources are within the subtense angle of the antenna beamwidth as depicted in FIG. 3 and that the antenna boresight has been aligned with the apparent source $S_3$, which is, of course, the power centroid of sources $S_1$ and $S_2$ as explained hereinabove. Referring to FIG. 3, $S_1$ is seen to be located at $-0.4$ beamwidths relative to boresight and $S_2$ at $+0.4$ beamwidths with the boresight or 0-beamwidth point on the centroid $S_3$. The relative magnitude of A is about $-4$ dB. Therefore $|S|/|A|$ is now 2 dB. The same relative ratio exists for the signals due to source $S_2$. It is important to note that $S_1$ and $S_2$ are uncorreltated within the time constant of low pass filters 42 and 44 and therefore are treated as independent signals such that superposition is valid.

To utilize the above described relationships to identify a multiple source condition, the MUST detection circuits shown in functional block diagram form in FIG. 5 may be used in accordance with our invention. Referring to the azimuth channel output A, the signal at this point is detected by envelope detector 48 and smoothed by low pass filter 62, producing a voltage AD proportional to the envelope of A. The error angle signal AE from phase detector 38 is detected and the absolute value $|AE|$ extracted by circuit 52. For processing purposes the relative signal gains are set such that for the single source case, $|AE| \cong AD$ and $|EE| \cong ED$ when the source is within the antenna beamwidth and off of boresight in either or both planes. The absolute value $|AE|$ is weighted by a threshold voltage t selected according to the noise and transfer characteristics of the monopulse system. The sum $|AE| + t$ is compared with AD in decision circuit 66. As may now be understood, if multiple sources are being received with respect to the azimuth plane, the value of |AE| + t will be relatively low since the error angle with respect to the apparent source (power centroid of the multiple sources) is very small, yet the value of AD is higher than if only a single source were on boresight. Thus, a "YES" decision is made, and indicated by lamp 70. If the weighted multiple sources also subtend an angle greater than represented by the threshold setting with respect to the elevation plane, lamp 72 will also so indicate. Therefore, if only a single source is within the antenna beamwidth and/or multiple sources subtend a very small angle in the azimuthal plane, the magnitude AD will be less than the absolute magnitude error signal |AE| plus the threshold voltage t to inhibit a "YES" decision from decision circuit 66.

Having described circuit means for identifying the presence of multiple sources within the beamwidth of a monopulse antenna system, an embodiment that advantageously utilizes the MUST detection principle to select one of such sources and to bring that source onto boresight will be explained. First, however, it is pertinent to list the various functions in this important implementation of our invention:

(1) Detect presence of multiple sources within the monopulse system beamwidth.
(2) Determine orientation of the planes of the multiple sources with respect to the azimuth and elevation planes of the monopulse antennas.
(3) Control the steering signals applied to the seeker gimbal drive to cause the system to select one of the sources and steer the boresight about that source.

In the preferred embodiment of our invention to be described hereinbelow, we will consider two major elements thereof; first, the MUST logic element which implements functions 1 and 2 above; and second, the steering control logic element which implements function 3.

Figure 6:
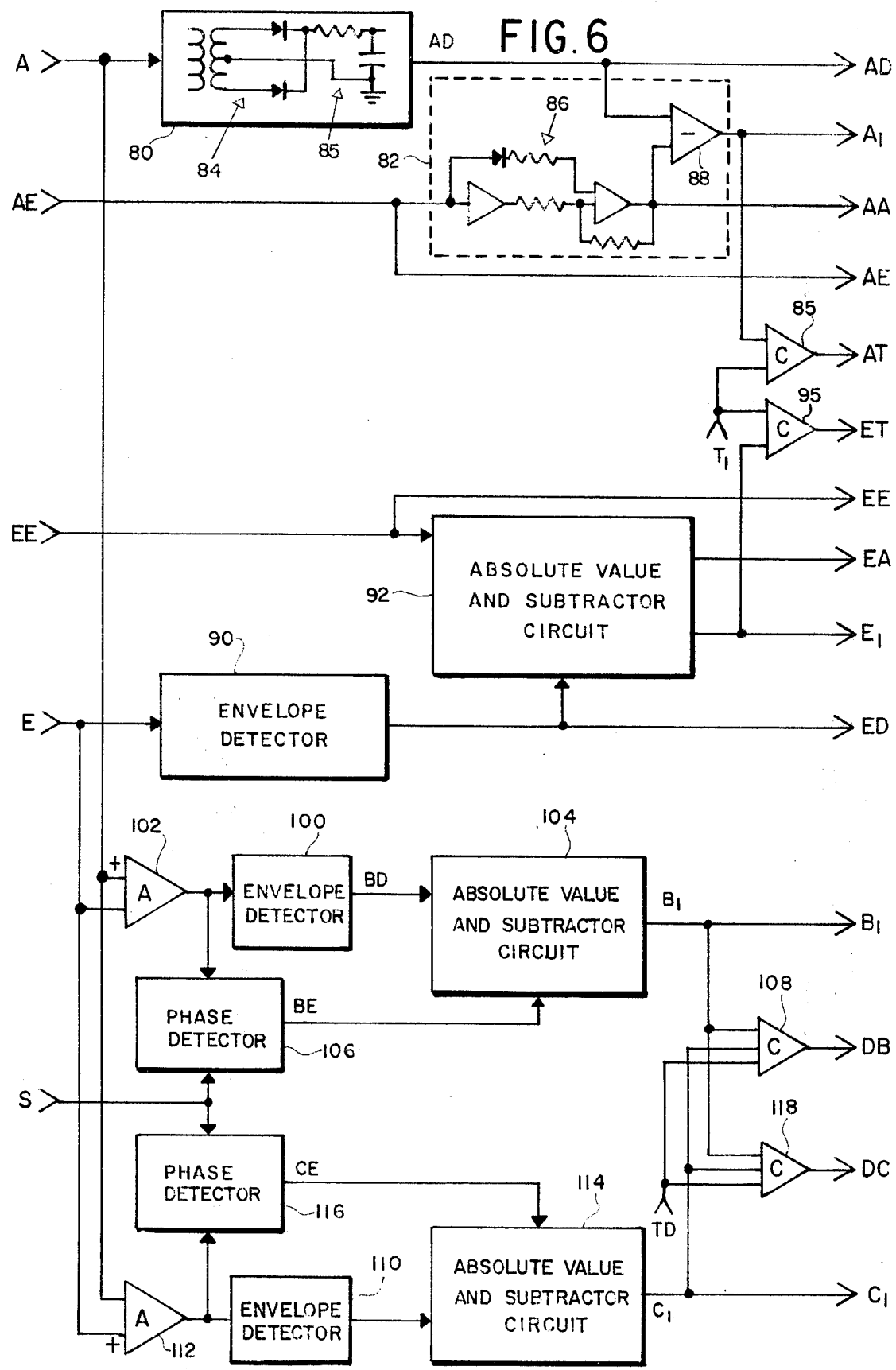
FIG. 6 is a block diagram of the MUST signal processing section of the preferred embodiment of our invention.

An analog implementation of the MUST signal processing element is shown in FIG. 6. The output signals from a monopulse tracking receiver such as shown in FIG. 5 represent the input signals to this processor. For example, the azimuth difference channel IF output signal A feeds envelope detector 80 comprising a conventional full wave rectifier 84 and lowpass filter circuit 85. The envelope amplitude output from detector 80 is signal AD. Similarly, the azimuth angle error signal AE from the receiver which may have a positive or negative value, drives absolute value and subtractor circuit 82. Circuit 86 therein outputs the absolute value of signal AE referred to as AA. Subtraction amplifier 88 measures the difference between signal AD and the absolute value signal AA with the difference referred to as $A_1$. In accordance with our invention, this difference signal $A_1$ is compared with a preset threshold voltage $T_1$ by means of comparator 85, whose output AT will be positive to indicate the presence of multiple sources or targets in the azimuthal plane.

As may be recognized the elevation signals E and EE drive envelope detector 90 and absolute value and subtractor circuits 92, respectively. Comparator 95 compares the elevation difference signal $E_1$ to the threshold voltage $T_1$, indicating multiple targets in the elevation plane by positive value of output ET. Threshold voltage $T_1$ is selected, depending on the noise characteristics of the monopulse tracking system and/or the apparent source subtense angle threshold desired and may typically range between 2 percent and 10 percent of signal amplitudes across the antenna beamwidth of the sum channel.

Thus, the above described circuits provide the following signals to the steering control logic element:
 AE and EE — azimuth and elevation angle error signals
 AD and ED — envelope value of azimuth and elevation difference channel signals
 AA and EA — absolute values of AE and EE
 $A_1$ and $E_1$ — difference between AD, A and ED, E.
 AT and ET — multiple source indication signals Next, to determine the plane of a pair of multiple sources in accordance with our invention a set of orthogonal axes displaced 45° from the antenna axes is synthesized and the multiple source algorithm previously described is applied. The A and E IF signals are combined in amplifiers 102 and 112, with appropriate phases to synthesize the diagonal IF difference channel signals. The output of amplifier 102 represents one IF input to phase detector (PD) 106 with sum IF signal S from the receiver providing the other signal input. The operation of a preferred ring modular type PD is fully described in Locke, "Guidance, Principles of Guided Missile Design", D. Van Nostrand Company, pp. 415–418. The composite signal consisting of the combined E and A signals out of amplifier 102 is processed by envelope detector 100, which is identical to previously described detector 80. The diagonal error signal output BE of PD 106 has its absolute value determined by circuit 104 identical to circuit 82. Circuit 104 also determines the difference $B_1$ between signals BD and |BE|.

Figure 7:
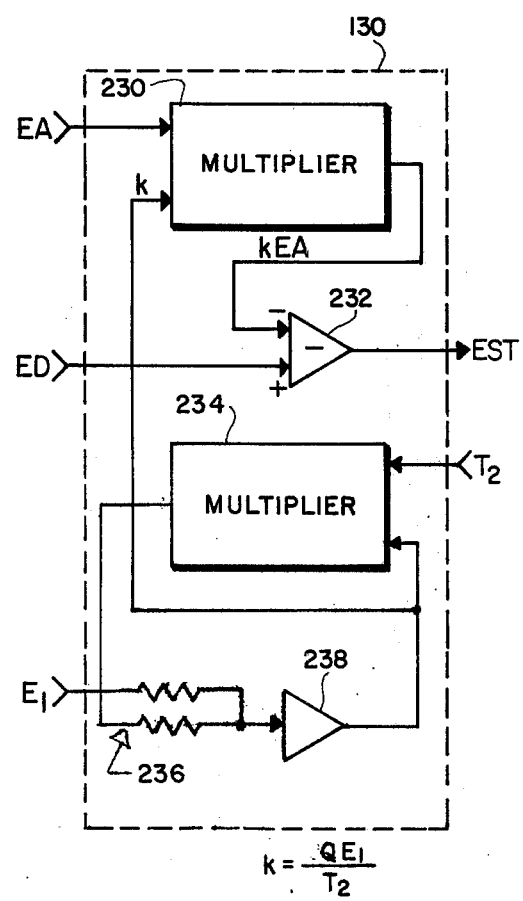
FIG. 7 is a diagram showing the azimuth and elevation planes of the monopulse system and a set of effective diagonal axis synthesized by the circuits shown in FIG. 6.

In the same fashion, PD 116, envelope detector 110 and circuit 114 operate on the opposite phase combination of A and E as the CW diagonal signal output 112, orthogonal to CCW output 102, producing difference signal $C_1$ therefrom. The significance of signals $B_1$ and $C_1$ may be explained with reference to FIG. 7 which illustrates the principal antenna planes and the 45° axes. Assume Sources $S_4$ and $S_5$ are diagonally displaced with respect to the principal axes. The angular distance or span between $S_4$ and $S_5$ projected on the 45° CW axis is defined as $C_1$ and the distance on the 45° CCW axis is defined as $B_1$.

Turning back to FIG. 6, the outputs $B_1$ and $C_1$ are coupled to comparators 108 and 118 along with presence threshold voltage $T_D$. The output of comparator 108, DB, will be positive when $C_1$ is greater than $B_1$. If $B_1$ is greater than $C_1$, output of comparator 118, DC, will be positive. If the multiple targets lie along one of the antenna principal axes within the tolerance of preset voltage $T_D$, the $B_1$ is equal to $C_1$ and DB and DC will both be negative.

Summarizing the functions of the MUST logic signal processor, the following indications are obtained:
(1) ET and AT both negative — single target
(2) ET and/or AT positive — multiple targets
(3) DB and DC both negative — multiple targets in a principal antenna plane
(4) DB or DC positive — multiple targets in plane diagonal to principal axes.

The MUST processor described above utilizes analog circuits; however, it will be obvious to those skilled in the art that the many of the functions can be performed with digital logic circuits and are within the scope of our invention.

Figure 8:
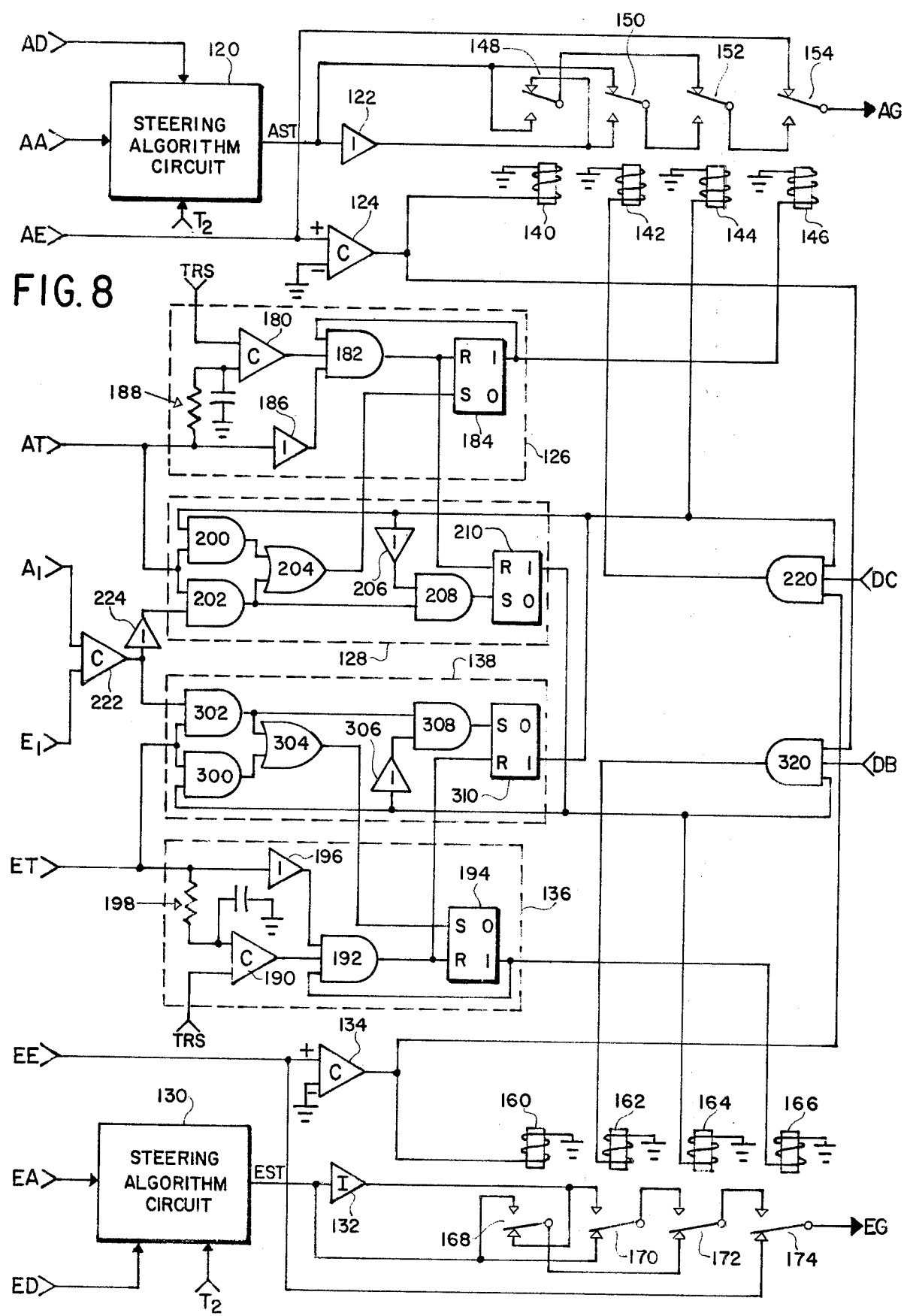
FIG. 8 is a block diagram of the steering control logic section of the preferred embodiment of our invention.

Next, the steering control logic element of our invention that receives the various signals from the MUST signal processing element will be described. FIG. 8 is a block diagram of this element. The operation of the circuits will be explained for four different operational situations:

Case 1 — Multiple targets in the plane of the antenna elevation axis

Case 2 — Multiple targets in the plane of the antenna azimuth axis

Case 3 — Multiple targets in the plane of the 45° CW axis

Case 4 — Multiple targets in the plane of the 45° CCW axis

When signals ET and AT are both negative, indicative of a single target, relays 140 through 146 and 160 through 166 are nonoperated and their contacts are in the position shown. Note that the azimuth angle error signal AE is thus connected directly to the seeker gimbal drive AG and elevation error signal EE to corresponding drive EG and conventional operation obtains. Assume first that Case 1 situation exists; ET will now be positive as well as the output of comparator 222 thereby enabling AND gate 302 and setting flip flop 194 via OR gate 304. Setting of flipflop 194 causes relay 166 to close connecting the elevation servo drive EG through the sequence of relay contacts to the output EST of the elevation channel steering algorithm circuit 130. Since the absolute value of azimuth error signal AE is within the threshold level $T_1$ of azimuth envelope value AD, the azimuth servo drive AG remains connected to the AE output via contacts 154 of relay 146. As may now be recognized, the elevation servo signal EG will be generated by the steering algorithm circuit 130, referred to as the EST signal, where:

$$EST = (ED - kEA) \times Sign(EE) \quad (1)$$

From this relationship it can be seen that the servo will change the angle in elevation of the monopulse antenna in the direction indicated by the sign term to the point at which the term (ED - kEA) goes to zero. Thus, by selecting the value of k the boresight is forced to move away from the centroid or apparent source toward one of the multiple sources. By selecting k properly, the system can be caused to align the antenna boresight more or less with one source. In a missile tracking system, it can be seen that, as the missile closes on the multiple targets, it is biased toward only one such target. As the missile approaches the targets, these targets will subtend a larger angle with respect to the missile antenna boresight. At the point at which the nonselected targets fall outside of the antenna beamwidth, the signal contributions from those targets of course reduce to zero. In other words as the missile closes, eventually only the selected target will be seen by the antenna. Thereafter, normal single-source operation will then be obtained and nominal boresight of antenna and selected target will occur. For this reason, it is only necessary for our invention to bias the tracking system toward one target rather than obtaining exact boresight early in the acquisition.

Figure 9:
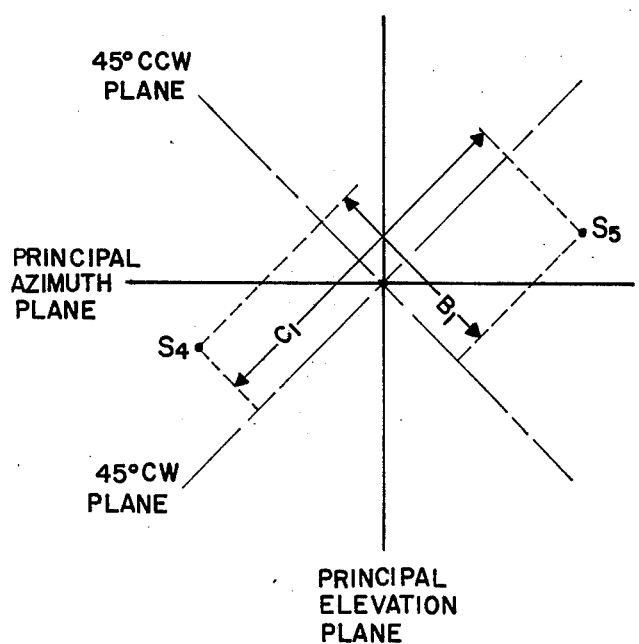
FIG. 9 is a block diagram of the steering algorithm circuit of FIG. 8.

The error amplitude factor k may be a constant such as 8, or may preferably be a variable function that interrelates $E_1$, EA and ED combined with a constant $T_2$ selected in accordance with the monopulse system characteristic. Circuit 130 shown in detail in FIG. 9, generates control signal EST using the variable k approach. The coefficient k is generated from $E_1$ and threshold constant $T_2$ by means of operational amplifier 238, resistor network 236 and multiplier 234. EA is multiplied by k in multiplier 230 and subtracted from ED by subtraction amplifier 232 producing the required EST signal. Azimuth circuit 120 is of course of identical construction.

Returning to FIG. 8, the sign term of equation (1) is implemented by comparator 134, inverter 132, relay 160, and contacts 168. When EE is negative, relay 160 will not operate and the sign of EST is reversed by inverter 132 via the NC contact of 168. When EE is positive, relay 160 operates, reversing the sign of EST as required.

When case 2 conditions arise and there are multiple targets only in the azimuth plane, a similar function is performed by the azimuth control circuits. In this instance, ET is off, AT is on, and $A_1$ is greater than $E_1$. AND gate 302 is blocked and flipflop 194 remains in the reset condition, thereby maintaining the connection of elevation servo EG to the elevation angle error signal EE. In the azimuth channel, flipflop 184 sets via AND gate 202 and OR gate 204, gate 202 being enabled from the low output of comparator 222 through inverter 224 combined with a positive value of AT.

Before describing the diagonal plane cases for multiple targets a possible problem should be pointed out. When multiple targets are found to lie on either diagonal plane, a guidance ambiguity can occur if the elevation and azimuth steering channels operate independently. In such case, the elevation channel could steer to a first target and the azimuth channel could steer to a second target.

As will be described, a cross-coupled logic is provided to resolve this ambiguity.

Assuming a case 3 condition, wherein the multiple target plane does not coincide with a principal antenna axis, both ET and AT will be high, indicating multiple targets with respect to both elevation and azimuth planes. Comparator 222 selects the channel having the larger subtended angle. Assume for example that $E_1$ is larger than $A_1$. AND gate 302 will be enabled and flipflop 194 will be set through OR gate 304. At the same time, flipflop 310 will be set through AND gate 308 since flipflop 210 is still in the reset condition. The setting of flipflop 184 is through AND gate 200 and OR gate 204. This logic results in both elevation and azimuth servos EG and AG being connected to their respective steering algorithm circuits (120, 130) by action of relays 146 and 166.

Setting of flipflop 310 also operates relay 144 thereby placing the contacts 150 of relay 142 in series with the AG/AST lead. A positive signal from AND gate 220 operates relay 142 causing a reversal of sign of AST. This action removes the ambiguity problem previously mentioned. AND gate 220 has been partially enabled by setting of flipflop 310. If the elevation error sign is positive and CW 45° signal $B_1$ is greater than the CCW 45° signal $C_1$, relay 142 will be operated since signal DC will be positive as applied to gate 220.

For the case 4 condition, when the azimuth subtense angle is greater than the elevation angle, an analogous action occurs. In this case, flipflop 184 and 210 are set first; flipflop 194 is then set and flipflop 310 is inhibited. Steering output AG is connected in the single-plane manner to the AST signal from circuit 120 through relay contacts 148 and 154. Elevation output EG is connected to the EST signal from circuit 130 through contacts 170, 172 and 174. If DC is positive (CW 45° signal $B_1$ is greater than CCW 45° Signal $C_1$), relay 162 is non-operated. If DB is positive, relay 162 will close as dictated by the sign of azimuth error signal AE to prevent driving toward a "phantom" target.

It is to be noted that reversion of the situation to a single target causes flipflops 194 and 184 to be reset through AND gates 182 and 192. To prevent loss of control due to intermittent fading of a single-target signal, or attempts to spoof by blinking tactics, comparators 180 and 190 are provided with time delay networks 188 and 198 respectively. The delay circuits and bias voltage TRS can be adjusted to match an expected fade or blinking period.

As may now be recognized, we have provided a new and novel monopulse tracking system that advantageously detects the presence of more than one radiating source falling within the monopulse antenna effective beamwith, applies a unique steering algorithm based upon signals generated by processing the received energy from the multiple radiating source, and biases the tracking control system toward only one of the sources. When applied to a seeker-type missile, our novel system causes the missile to close toward the selected source in accordance with the steering algorithm. Since the system can discriminate against the non-selected sources, the missile closes on the selected source to the point at which the non-selected sources are no longer in the antenna beamwidth. The tracking system then guides the missile to intercept the source where otherwise the missile would have passed between the multiple sources without an intercept.

For explanatory purposes, we have shown the various electronic circuits in discrete-component form and, in some instances, in analog implementations. It will be obvious to those skilled in the art that the circuits may be implemented through large scale integration (LSI) techniques for missile applications, and logic circuit implementations substituted for the exemplary analog circuits. Similarly, solid state switching can be used to replace the mechanical relays shown for descriptive purposes. All such variations in design and implementation are to be considered within the scope of our invention.

We claim:

1. A detector for adapting a monopulse tracking receiver system to detect the presence of multiple radiating sources within the effective antenna beamwidth of the system comprising:
    signal processing means connected to the outputs of said receiver system for comparing the relative amplitudes of the output signals from said receiver system; and
    decision means connected to said signal processing means for providing an indication when the relative amplitudes of such signals are characteristic of the presence of multiple radiating sources.

2. A detector for adapting a monopulse tracking receiver system to detect the presence of multiple radiating sources within the effective antenna beamwidth of the system comprising:
    amplitude measurement means connected to a difference channel output of the receiving system for generating an amplitude signal proportional to the amplitude of the signal at said output;
    absolute magnitude measurement means connected to the receiver system for generating a magnitude signal proportional to the absolute magnitude of the error signal derived from the difference channel output signal by the receiver system; and
    decision means connected to said amplitude measurement means and to said absolute magnitude measurement means for providing an indication when the amplitude signal from said amplitude measurement means is greater than the magnitude signal from said absolute magnitude measurement means thereby indicating the presence of multiple radiating sources within the effective antenna beamwidth of the receiver system.

3. The detector as defined in claim 2 which further comprises weighting means connected to said decision means for adding a selected threshold signal to the magnitude signal.

4. The detector as defined in claim 2 in which:
    said amplitude measurement means includes an envelope detector and a low pass filter; and
    said decision circuit means includes a comparator for receiving the amplitude signal and the magnitude signal, said comparator providing said indication when the amplitude signal is greater than the magnitude signal.

5. The detector as defined in claim 2 in which:
    said amplitude measurement means includes a full-wave detector and a low-pass filter; and
    said decision circuit means includes a subtractor for producing a difference signal proportional to the difference between the amplitude signal from said low pass filter and the magnitude signal from said absolute magnitude measurement means, and comparator means for comparing the difference signal to a selected threshold signal, said comparator thereby indicating such presence of multiple radiating sources when the difference signal is greater than the threshold signal.

6. A monopulse tracking system for tracking one of multiple radiating sources comprising:
    a monopulse radio receiver connected to a steerable monopulse antenna, said receiver having a difference channel output, a first angular error signal output, and a servo for steering said antenna;
    signal processing means connected to said receiver, said signal processing means generating an amplitude signal proportional to the amplitude of the signal at said difference channel output and a magnitude signal proportional to the absolute magnitude of the signal at said error signal output, said signal processing means also having decision circuit means for comparing the amplitude signal and the magnitude signal, said decision means generating a second angular error signal when the amplitude signal is greater than the magnitude signal; and
    steering control means connected to said signal processing means and said receiver, said steering control means arranged to connect said first error signal output to said servo only when a single radiating source is within the effective beamwidth of said antenna and to connect the second error signal from said decision circuit to said servo only when multiple radiating sources are within the effective beamwidth of said antenna.

7. The monopulse tracking system defined in claim 6 in which:
    said processing means includes an envelope detector and low-pass filter connected to said difference channel output;

said decision circuit means includes a subtractor, a comparator, and a steering algorithm circuit, said subtractor and said comparator serving to produce a control signal when the difference between the amplitude signal and the magnitude signal is greater than a selected threshold signal, and said steering algorithm circuit serving to produce the second angular error signal; and said steering control means includes relay means for switching said servo from said first error signal output to the output of said steering algorithm circuit when the amplitude signal is greater than the magnitude signal.

8. The monopulse tracking system defined in claim 7 in which said steering algorithm circuit includes means for weighting the second angular error signal whereby said servo causes said antenna to steer toward one of such multiple radiating sources.

9. A monopulse radio tracking system capable of discriminating among multiple radiating sources comprising:

a monopulse tracking radio receiver having a steerable directional monopulse antenna, said antenna steerable in response to antenna control signals;

signal processing means connected to said receiver for determining the presence of multiple radiating sources within the beamwidth of said antenna, said signal processing means comparing the relative amplitudes of output signals from said receiver system;

decision means connected to said signal processing means for providing an indication when the relative amplitudes of such signals are characteristic of the presence of multiple radiating sources; and control signal generation means connected to said receiver, said signal processing means, and said decision means, for generating antenna control signals, such control signals utilized to steer said antenna toward only one of such multiple radiating sources.

10. The system defined in claim 9 in which:

said monopulse radio tracking system is installed in a homing-type guided missile having an autopilot;

said steerable antenna includes gimbal steering means for steering said antenna toward only one of such multiple sources; and gimbal pick-off means associated with said gimbal steering means for generating pick-off signals to cause said autopilot to align the axis of said missile with the boresight of said antenna.

11. The signal as defined in claim 10 in which:

said signal processing means includes an elevation signal channel and an azimuth signal channel; and said control signal generation means generates an elevation control signal when such multiple radiating sources are separated with respect to the elevation plane of said antenna, and an azimuth control signal when such multiple radiating sources are separated with respect to the azimuthal plane of said antenna.

12. The system as defined in claim 11 in which:

said control signal generation means includes diagonal plane detection means for comparing signals in said elevation signal channel and said azimuth signal channel, said diagonal plane detection means causing said elevation control signal and said azimuth control signal to steer said antenna toward only one of such multiple radiating sources when such sources are separated with respect to both elevation and azimuthal planes.

13. A monopulse tracking system for tracking one of multiple radiating sources comprising;

a monopulse radio receiver connected to a steerable monopulse antenna, said receiver having a sum channel signal output, an azimuth difference channel output, an elevation difference channel output, a first azimuth angular error signal output, a first elevation angular error signal output, an azimuth servo for steering said antenna in the azimuthal plane, and an elevation servo for steering said antenna in the elevation plane;

azimuth signal processing means connected to said azimuth difference channel output and to said first azimuth angular error signal output, said azimuth signal processing means for generating an azimuthal amplitude signal proportional to the amplitude of the signal at said azimuth difference channel output and an azimuthal magnitude signal proportional to the absolute magnitude of the signal at said first azimuth angular error signal output, said azimuth signal processing means also having azimuth decision circuit means for comparing the azimuthal amplitude signal and the azimuthal magnitude signal, said azimuth decision means generating a second azimuth angular error signal when the azimuthal amplitude signal is greater than the azimuthal magnitude signal;

elevation signal processing means connected to said elevation difference channel output and to said first elevation angular error signal output, said elevation signal processing means for generating an elevation amplitude signal proportional to the amplitude of the signal at said elevation difference channel output and an elevation magnitude signal proportional to the absolute magnitude of the signal at said first elevation angular error signal output, said elevation signal processing means also having elevation decision circuit means for comparing the elevation amplitude signal and the elevation magnitude signal, said elevation decision means generating a second elevation angular error signal;

diagonal plane detection means connected to said sum channel output, said elevation difference channel output, and said azimuth difference channel output, said diagonal plane detection means arranged to produce a clockwise control signal when multiple radiating sources lie in a diagonal plane rotated in a clockwise direction with respect to the elevation and azimuth planes, and to produce a counterclockwise control signal when multiple radiating sources lie in a diagonal plane rotated in a counterclockwise direction with respect to the elevation and azimuth planes;

steering control means connected to said azimuth signal processing means, said elevation signal processing means, and said diagonal plane detection means, said steering control means responsive to said second azimuth angular error signal and said second elevation angular error signal to cause said azimuth servo to steer said antenna so as to move the boresight azimuthal plane toward one of the multiple radiating sources, and to cause said elevation servo to steer said antenna so as to move the boresight elevation plane toward one of the multiple radiating sources, and said control signal from said diagonal plane detection means operative to cause azimuth servo and said elevation servo to each steer said antenna toward the same one of such multiple radiating sources whereby the boresight of said antenna becomes aligned with said one source.

14. The monopulse tracking system as defined in claim 13 in which:
said azimuth decision circuit means includes a first subtractor, a first comparator, and an azimuth steering algorithm circuit;
said elevation decision circuit means includes a second subtractor, a second comparator, and an elevation steering algorithm circuit; and
said steering control means includes elevation switching means for switching said elevation servo from said first elevation angular error signal output to the output of elevation steering algorithm circuit when such multiple radiating sources are separated in the elevation plane, and azimuth switching means for switching said azimuth servo from said first azimuth angular error signal output to the output of azimuth steering algorithm circuit when such multiple radiating sources are separated in the azimuthal plane.

15. The monopulse tracking system as defined in claim 14 in which said diagonal plane detection means includes:
first combiner for combining the outputs from said azimuth difference channel output and said elevation difference channel output in one phase relationship so as to generate a first composite signal;
second combiner for combining the outputs from said azimuth difference channel output and said elevation difference channel output in the opposite phase relationship so as to generate a second composite signal;
first phase detector connected to said first combiner and said sum channel output for generating a first diagonal error signal from the first composite signal and the sum channel signal;
second phase detector connected to said second combiner and said sum channel output for generating a second diagonal error signal from the second composite signal and the sum channel signal;
first envelope detector connected to said first combiner for generating a first composite amplitude signal;
second envelope detector connected to said second combiner for generating a second composite amplitude signal;
first absolute value circuit for generating a first diagonal magnitude signal proportional to the absolute magnitude of the first diagonal error signal;
second absolute value circuit for generating a second diagonal magnitude signal proportional to the absolute magnitude of the second diagonal error signal;
first subtraction means for generating a first diagonal difference signal proportional to the difference between the first composite amplitude signal and the first diagonal magnitude signal;
second subtraction means for generating a second diagonal difference signal proportional to the difference between the second composite amplitude signal and the second diagonal magnitude signal;
diagonal comparator means having two outputs, said comparator means for comparing first diagonal difference signal and second diagonal difference signal, such comparison thereby producing said clockwise or counterclockwise control signal only when multiple radiating sources are present and in a diagonal plane with respect to the antenna elevation and azimuthal plane.

16. The monopulse tracking system as defined in claim 15 in which:
said diagonal comparator means includes threshold biasing means, said biasing means arranged to prevent the generation of said control signals when no multiple radiating sources are present in such diagonal plane; and
said control signals are produced when the output of only one of said two diagonal comparator means outputs is of a positive polarity.

* * * * *